US010305600B2

(12) United States Patent
Franck et al.

(10) Patent No.: US 10,305,600 B2
(45) Date of Patent: May 28, 2019

(54) MULTILEVEL OPTICAL SIGNAL SYSTEM

(71) Applicant: MELLANOX TECHNOLOGIES DENMARK APS, Roskilde (DK)

(72) Inventors: Thorkild Franck, Roskilde (DK); Steen Bak Christensen, Roskilde (DK)

(73) Assignee: MELLANOX TECHNOLOGIES DENMARK APS, Roskilde (DK)

( * ) Notice: Subject to any disclaimer, the term of this patent is extended or adjusted under 35 U.S.C. 154(b) by 0 days.

(21) Appl. No.: 15/297,457

(22) Filed: Oct. 19, 2016

(65) Prior Publication Data

US 2017/0111118 A1   Apr. 20, 2017

(30) Foreign Application Priority Data

Oct. 19, 2015 (DK) ................................. 2015 70674

(51) Int. Cl.
*H04B 10/50* (2013.01)
*H04B 10/54* (2013.01)

(52) U.S. Cl.
CPC ................................. *H04B 10/541* (2013.01)

(58) Field of Classification Search
CPC ........................ H04B 10/5053; H04B 10/506
See application file for complete search history.

(56) References Cited

U.S. PATENT DOCUMENTS

| 8,380,085 | B2 | 2/2013 | Gupta et al. | |
|---|---|---|---|---|
| 9,705,603 | B1 * | 7/2017 | Abbas | H04B 10/564 |
| 2003/0021011 | A1 * | 1/2003 | Huang | H04B 10/2941 |
| | | | | 359/337.1 |
| 2004/0021829 | A1 | 2/2004 | Griffin | |
| 2007/0189769 | A1 * | 8/2007 | Mauro | H04B 10/2525 |
| | | | | 398/66 |
| 2010/0247107 | A1 * | 9/2010 | Sadot | H04B 10/541 |
| | | | | 398/140 |
| 2011/0052209 | A1 * | 3/2011 | Gupta | H04B 10/541 |
| | | | | 398/186 |
| 2014/0133870 | A1 | 5/2014 | Lee et al. | |
| 2014/0301736 | A1 | 10/2014 | Huh et al. | |
| 2017/0149507 | A1 * | 5/2017 | Le Taillandier De Gabory | |
| | | | | H04B 10/50575 |

FOREIGN PATENT DOCUMENTS

| EP | 1 641 151 A1 | 3/2006 |
|---|---|---|
| JP | S63-5633 A | 1/1988 |

OTHER PUBLICATIONS

Danish Search Report and Search Opinion dated May 17, 2016, by the Danish Patent and Trademark Office in corresponding Danish Patent Application PA 2015 70674. (8 pages).

* cited by examiner

*Primary Examiner* — Nathan M Cors
(74) *Attorney, Agent, or Firm* — Alston & Bird LLP

(57) ABSTRACT

The invention comprises a multilevel optical signal system comprising two or more light source branches and an optical power-combiner, wherein each branch comprising a light source, an optical modulator and an electrical driver for the modulator, wherein each electrical driver is configured for being driven by electrical signals to drive the modulator to modulate the light generated by the light source into a corresponding 2-level data signal such that the respective 2-level data signals differs in power level.

12 Claims, 1 Drawing Sheet

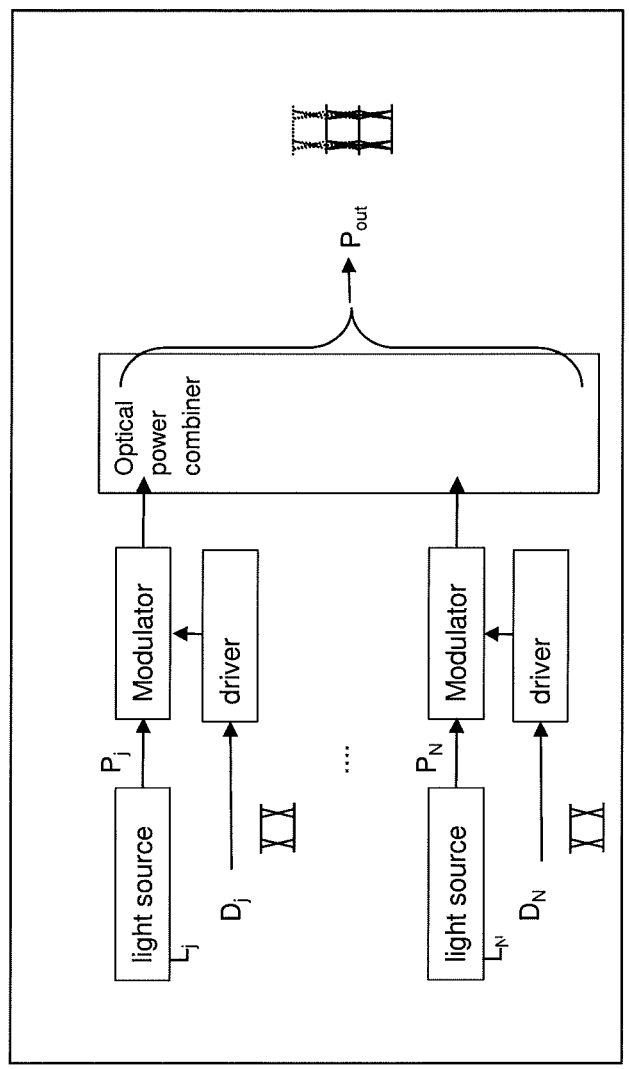

MULTILEVEL OPTICAL SIGNAL SYSTEM

TECHNICAL FIELD

The invention relates to a multilevel optical signal system and in particular a multilevel optical signal system suitable for converting electrical signal to optical signal.

BACKGROUND ART

The need for fast transmission of signals in optical fibers is general increasing. Whereas today's optical interconnects are based on optical NRZ (non return to zero) modulation formats with two optical power levels, future interconnects might be based on other modulation schemes, multi-level optical links being one proposal, and several methods of converting electrical signals to multilevel signals have been suggested.

U.S. Pat. No. 8,380,085 (NEC LABORATORIES AMERICA INC) describes a method of processing data that includes receiving a plurality of binary electronic signals and generating an optical signal by a number of lasers that is equal to or greater than the number of binary electronic signals. The optical signal is generated at one of a plurality of intensity levels, and each intensity level represents a particular combination of bit values for the plurality of binary electronic signals. The optical signal is converted into an electronic signal having the plurality of intensity levels. An apparatus for processing data is provided that includes a plurality of lasers configured to emit light at a plurality of frequencies, and a plurality of modulators configured to receive a plurality of binary electronic signals and to modulate the light

DESCRIPTION OF THE INVENTION

Whereas the method disclosed in U.S. Pat. No. 8,380,085 may increase the transmission rate in optical fiber, there is still a need for an effective multilevel optical signal where the resulting optical signal can be decoded with a relatively low bit error rate.

In an embodiment of the invention it is an object to provide a fast multilevel optical signal system suitable for converting electrical signal to optical signal and where the multilevel optical signal can be converted to electrical signals with a low bit error rate.

These and other objects have been solved by the invention or embodiments thereof as defined in the claims and as described herein below.

It has been found that the invention or embodiments thereof have a number of additional advantages which will be clear to the skilled person from the following description.

The term "substantially" should herein be taken to mean that ordinary product variances and tolerances are comprised.

All features of the inventions and embodiments of the invention as described above including ranges and preferred ranges can be combined in various ways within the scope of the invention, unless there are specific reasons not to combine such features.

The inventors of the present invention has found that by providing the multilevel optical signal system such that the data signals are in phase and are synchronized in frequency to have fully timely overlying bit rate a very effective multilevel optical signal system is provided which can be reconverted to electrical signals in a relatively simple and effective way.

In an embodiment of the invention modulated light from a number of branches are combined in a passive, optical power-combiner into one optical signal. Each branch comprises a CW (continuous wave) light source, $L_j$, an optical modulator and an electrical driver for the modulator. Each electrical driver takes the two-level data signal, $D_j$, and all data signals are synchronous in phase and frequency with a bit rate of B. The combined output will have the same baud-rate as the data signals bit rate, B, now carrying all N signals, with $2^N$ different symbols and a total bit-rate of N*B.

In an embodiment the optical power level out of each branch is adjusted to different levels, or weights. A preferred design is binary stepped weights so that the output of branch n+1 is the double of branch n. For N=2 the suggested 4-level signal generated by branch 1 having a power of $P_0$ and branch 2 a power of $2P_0$.

In an embodiment the branches of the multilevel optical signal system are configured to generate the respective 2-level data signals such that the power from a laser source of a first branch is P0 and the power of from a laser source of an N'th branch is $2^N$ times P0.

In the general case, the transmitted power is $P_{out} = \Sigma D_j * P_j = \Sigma D_j * W_j * P_0$; j=1 ... N.

In the binary weighted 4-level transmitter $P_{out} = P_0 \Sigma D_j * 2^{j-1} = P_0\{D_1 + 2D_2\}$, i.e., the levels are 0, $P_0$, $2P_0$, $3P_0$. Or by different scaling, 0, ½$P_0$, $P_0$, 1½$P_0$.

The light sources $L_1 \ldots L_N$ in each branch will advantageously generate light having different wavelengths and may also be designed with deliberately different wavelengths. In an embodiment the integrating photo receiver on the receive side will not distinguish the wavelengths, only integrate the power of light. Applying different wavelengths may add to distinguish the signals e.g. for splitting the signals e.g. by optical filters at the receiver.

In an embodiment the light sources must not correlate in optical phase as interference may occur in the combiner and constructive or destructive interference is undesirable. The combiner advantageously add optical power and it is therefore desired that the coherence length between the sources to be relatively short. There is no reason to believe that separate lasers would not be uncorrelated and have very short and insignificant coherence length.

In an embodiment it is desired that the lasers are not narrow band, but relatively broad, so stochastically destructive interference will become a relatively small part of the combined power. In other words, the phases of the optical carriers must preferably be misaligned.

A "dithering" signal may be applied to the forward current to the lasers so that the phase changes over time and/or to some extend decreases the phase alignment between lasers. The frequencies of the dithering signals may be prime factors to avoid common frequencies.

In an embodiment Fabry-Perot lasers are used and in another narrow line width lasers are used. In both cases, difference in wavelength and the above described dithering signal may be applied. Other continuous wave light sources could also be applied.

Requirements on the linearity of the electrical drivers are avoided as each drivers will have only two levels. All drivers can be equal and operate equally. Also the light modulators need no strict linearity. This can be achieved with today's technology.

The weight of the light of each branch (same as the optical power level of each branch) can be maintained by monitoring the CW output of the laser before the modulator, or even after the modulator if a fixed modulation index is maintained, e.g., 50% modulation over a period of time.

On the receive side, a multi-level-capable receiver is needed to detect and decode the optical signal. The suggested transmitter does not impose special requirements to the receiver over other multi-level-capable receivers.

Compared to a 2-level transmitter that can provide optical power up to P0, a 4-level binary weighted transmitter of an embodiment of the invention requires only 3 dB of the optical link budget, because the power levels of the two branches would have to be ½P0 and P0 with available technology. The loss in the optical power combiner is considered negligible. Other multi-level transmitters may impair the link budget even further by imposing complicated linearity requirements to the drivers and optical modulators which this proposal avoids. It means at an unchanged baud-rate, the link bit-rate can be doubled at a cost of 3 dB optical penalty. There may be other inevitable penalties but the solution provided by the present invention is close to ideal.

FIG. 1 shows a preferred embodiment of the multilevel optical signal system comprising an optical power combiner and a number of branches here represented by branches J and N, where each branch comprises a light source, a modulator and a driver for the modulator.

In use the electrical signals $D_j$ and $D_N$ are transmitted to the drivers or the respective branches where they are concerted to respective 2-level optical data signals by the light sources $L_J, L_N$ and the modulators of the respective branches. The 2-level optical data signals are transmitted to the optical power combiner where they are combined to a multilevel optical signal $P_{out}$.

The invention claimed is:

1. A multilevel optical signal system comprising:
    two or more light source branches; and
    an optical power-combiner,
    wherein each light source branch of the two or more light source branches comprises:
        a light source adapted for generating laser light,
        an optical modulator, and
        an electrical driver for the modulator,
    wherein:
        each electrical driver is configured for being driven by electrical signals to drive the modulator to modulate the laser light into a corresponding optical 2-level data signal,
        a first dithering signal is applied to a first electrical signal provided by a first electrical driver to the corresponding light source for driving of the light source and a second dithering signal is applied to a second electrical signal provided by a second electrical driver to the corresponding light source for driving of the light source, a frequency of the first dithering signal and a frequency of a second dithering signal having non-overlapping prime factors,
        the electrical signals provided to each electrical driver are substantially synchronous in phase and frequency and no substantial time delays are inherently introduced in the implementation,
        the respective branches are optically connected to the optical power combiner for transmitting the respective optical 2-level data signals to the optical power combiner,
        the optical power-combiner is configured for combining the respective optical 2-level data signals into a multilevel optical signal,
        the light sources of each branch are asynchronous with respect to one another such that optical carriers of the optical 2-level data signals are substantially asynchronous in phase and frequency to minimize constructive or destructive interference of the optical 2-level data signals when the optical 2-level data signals are combined by the optical power-combiner, and
        the branches are configured (a) to generate the respective 2-level data signals such that they differ in power level by applying light sources with different power and (b) so transitions in amplitude of the optical 2-level data signals are substantially synchronous when the 2-level data signals are combined by the optical power-combiner.

2. The multilevel optical signal system of claim 1, wherein each light source is a continuous wave light source.

3. The multilevel optical signal system of claim 1, wherein the laser light of the branches have a band width of at least about 50 nm.

4. The multilevel optical signal source of claim 1, wherein the laser light of at least two branches differs in wavelength(s).

5. The multilevel optical signal system of claim 1, wherein the optical combiner is configured for combining the respective 2-level data signals into a multilevel optical signal having the same baud rate as the 2-level data signals bit rate.

6. The multilevel optical signal system of claim 1, wherein the power of light from a laser source of a zeroth branch is P0 and the power of light from a laser source of an N'th branch is $2^N$ times P0, wherein N is a natural number.

7. A multilevel receiver configured for receiving and decoding an optical signal generated by the multilevel optical signal source system of claim 1 wherein the multilevel receiver comprises:
    an electrical circuitry comprising a photo diode for converting the multilevel optical signal to a multilevel electrical signal; and
    decoding means for separating the multilevel signal into individual electrical signals.

8. The multilevel optical signal system of claim 1, wherein the optical power-combiner is a passive optical power-combiner.

9. The multilevel optical signal system of claim 1, wherein laser light generated by a first light source of a first light branch of the two or more light source branches is out of optical phase with laser light generated by a second light source of a second light branch of the two or more light source branches.

10. The multilevel optical signal system of claim 1, wherein the laser light of the branches has a band width of at least about 100 nm.

11. The multilevel optical signal system of claim 1, wherein the laser light of the branches has a band width of at least about 200 nm.

12. The multilevel optical signal system of claim 6, wherein each light source is a continuous wave light source.

* * * * *